United States Patent [19]

Hogan et al.

[11] 4,155,159
[45] May 22, 1979

[54] TOOL FOR CONNECTOR MEMBER

[75] Inventors: Vaughan C. Hogan, Sun Valley; Eleanor A. Landgreen, Temple City, both of Calif.

[73] Assignee: International Telephone and Telegraph Corporation, New York, N.Y.

[21] Appl. No.: 881,661

[22] Filed: Feb. 27, 1978

Related U.S. Application Data

[62] Division of Ser. No. 718,906, Aug. 30, 1976, Pat. No. 4,084,882.

[51] Int. Cl.² .................................... H01R 43/00
[52] U.S. Cl. .................................... 29/764; 29/278
[58] Field of Search ............. 29/764, 762, 278, 629, 29/426, 427

[56] References Cited

U.S. PATENT DOCUMENTS

| | | | |
|---|---|---|---|
| 3,570,096 | 3/1971 | Sosinski | 29/764 |
| 3,696,492 | 10/1972 | Baillard | 29/764 X |
| 3,951,514 | 4/1976 | Meding, Jr. | 339/136 M X |

*Primary Examiner*—Carl E. Hall
*Attorney, Agent, or Firm*—Thomas L. Peterson

[57] ABSTRACT

A fiber optic connector member having a removable front plate for protecting the faces of optical fibers mounted within the connector. The plate is retained within the connector shell by a resilient retention finger. The finger extends into a T-shaped slot formed on the outer surface of the plate. The slot opens at the front face of the plate. An extraction tool is disclosed which may be inserted into the slot to release the retention finger and grip shoulders formed on the sides of the slot allowing the plate to be withdrawn from the connector shell by pulling the tool forwardly of the connector.

5 Claims, 7 Drawing Figures

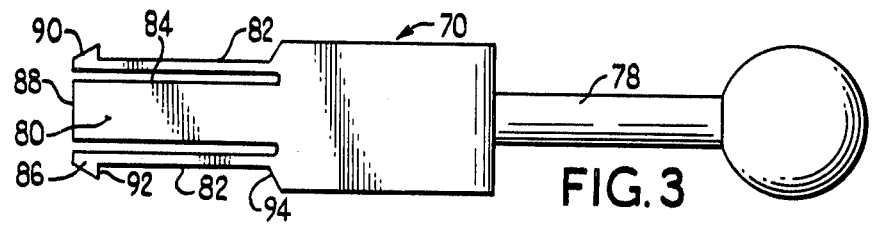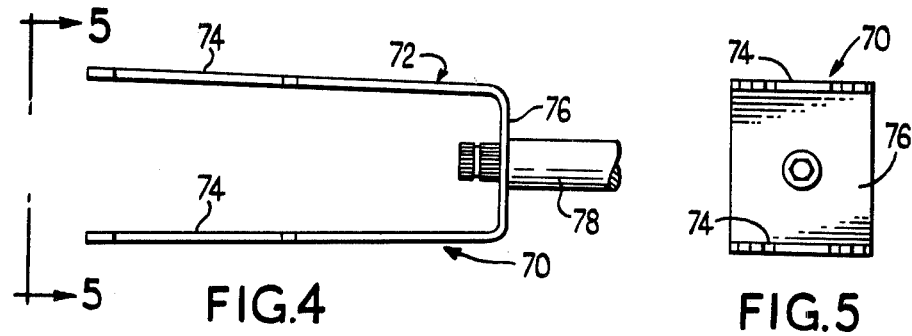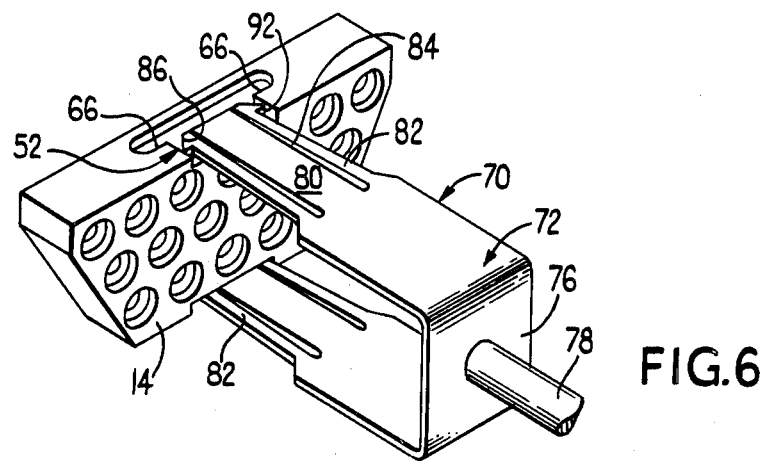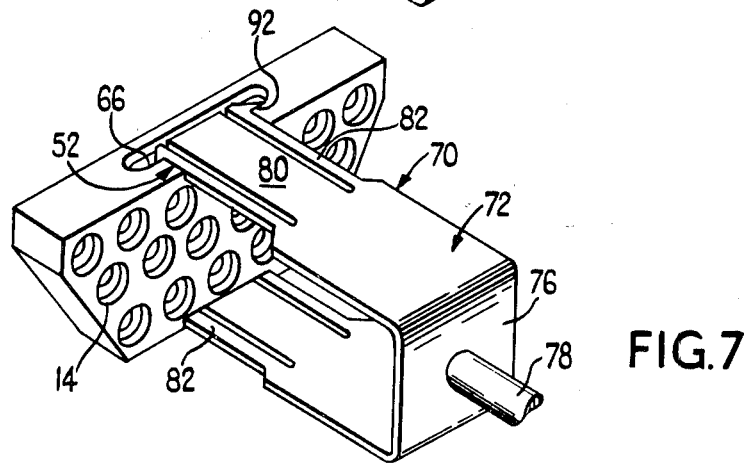

TOOL FOR CONNECTOR MEMBER

This is a division, of application Ser. No. 718,906, filed Aug. 30, 1976, now U.S. Pat. No. 4,084,882.

BACKGROUND OF THE INVENTION

This invention relates generally to a connector member and, more particularly, to a fiber optic connector member having a removable front insulator, and to an extraction tool for releasing and withdrawing the insulator from the connector shell.

In a fiber optic connector, it is desirable to provide a front insulator within the connector shell which protects the termination pins that terminate the fiber optic bundles mounted in the connector, yet is removable so that the face of the fiber bundles can be cleaned periodically in the field while the connector is in use. The front insulator is retained in the connector shell by means of suitable resilient retention fingers on opposite sides of the shell. A tool is required to release the retention fingers and grip the front insulator in a positive fashion so that it can be readily withdrawn from the shell without damaging either the insulator or the termination pins in the connector.

U.S. Pat. No. 3,951,514 to Medina discloses such a connector in which a central elongated slot extends from the forward face of the removable front insulator that protects the contact elements in the connector to a rearwardly facing surface thereon. Clearance spaces are provided between the inner surface of the connector shell and the outer surface of the front insulator, extending from the front face of the insulator to rearwardly facing shoulders thereon which are engaged by the retention fingers mounted in the shell. An extraction tool is provided which comprises a shaft having a handle mounted on the rear end thereof and a transversely extending arm on the foward end of the shaft. The arm is dimensioned so as to be slidable witin the central slot in the front insulator of the connector. In addition, a U-shaped element is rotatably mounted adjacent to the forward end of the shaft. This element has a pair of forwardly extending legs which are generally parallel to and spaced from the shaft. The distance between the legs and shaft corresponds to the distance between the central slot in the front insulator of the connector and the retention fingers mounted in the shell that retain the insulator therein. The tool is inserted into the connector member with the transversely extending arm sliding through the central slot in the front insulator and the forwardly extending legs on the rotatable element of the tool extending into the clearance spaces to lift the retention fingers out of engagement with their cooperating retention shoulders on the front insulator to thereby release the fingers, leaving the insulator free floating in the shell. The handle of the tool is then rotated approximately 90° so that the transversely extending arm on the forward end of the shaft will engage a rearwardly facing surface on the insulator. The tool is then withdrawn from the connector shell to extract the insulator therefrom. Thus, a single tool is utilized to release the retention fingers and withdraw the front insulator from the connector shell without damaging the pins that terminate the fiber bundles within the connector, thereby allowing the faces of the fiber bundles to be easily cleaned in the field.

While the foregoing arrangement is satisfactory from a functional standpoint, it has two disadvantages. THe central slot in the front insulator which receives the transversely extending arm on the forward end of the shaft of the tool uses up valuable space in the connector which could otherwise be utilized for mounting optical fiber termination pins or contacts. Secondly, the tool is relatively expensive since the U-shaped element must be rotatably mounted with respect to the shaft of the tool and, in addition, manipulation of the tool to release the retention fingers in the connector and withdraw the front insulator therefrom is complicated by the fact that the handle on the tool must be rotated. The purpose of the present invention is to modify the Medina connector and tool so as to eliminate the central slot in the front insulator of the connector and to simplify the structure and handling of the tool.

SUMMARY OF THE INVENTION

According to the principal aspect of the present invention, a connector of the general type described above is modified by forming rearwardly facing shoulders on the sides of the slot or clearance space provided in the outer surface of the front insulator. As a consequence, the central slot required in the front insulator in the Medina connector may be eliminated. The tool of present invention embodies a relatively rigid central plate and a pair of resilient arms which extent along the edges of the plate. Hooks are formed on the outer edges of the arms. When the tool is inserted into the slot in the front insulator, the arms deflect inwardly toward the central plate until the hooks pass the rearwardly facing shoulders on the sides of the slot, whereupon the arms will spring laterally outwardly so that the hooks will engage such shoulders. Simultaneously, the central plate of the tool releases the retention finger in the shell which engages the rear of the slot. Thus, by pulling the tool forwardly relative to the connector, the front insulator may be removed from the connector shell. The tool requires no movable parts, is relatively simple in structure and inexpensive to manufacture, and may be manipulated by the operator without the requirement of rotating the handle of the tool. Thus, the present invention simplifies the operation of removing the front insulator from the connector shell and allows a greater number of contact elements to be mounted in the connector.

BRIEF DESCRIPTION OF THE DRAWINGS

FIG. 3 is a top view of the extraction tool of the present invention;

FIG. 4 is a side elevational view of the extraction tool illustrated in FIG. 3;

FIG. 5 is a front end view of the extraction tool;

FIG. 6 is a perspective view of the front insulator removed from the connector shell with the tool of FIGS. 3 to 5 partially inserted into T-shaped slots in the insulator; and FIG. 7 is a perspective view similar to FIG. 6 showing the tool fully inserted into the slots in the front insulator in a position wherein the retention fingers in the connector shell are released, thereby allowing the front insulator to be removed from the front of the connector shell.

DESCRIPTION OF THE PREFERRED EMBODIMENT

Figure 1:
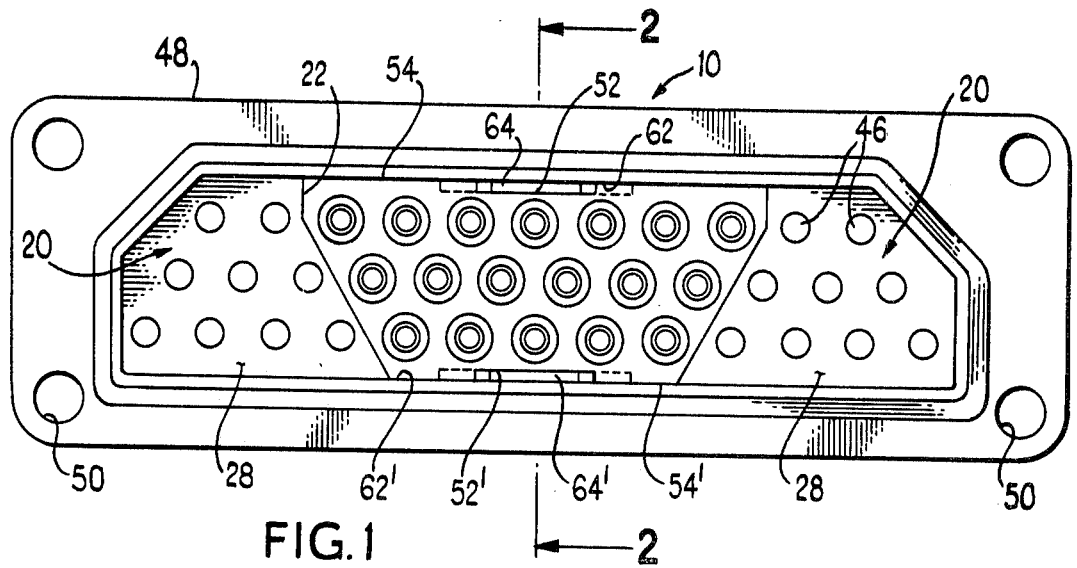
FIG. 1 is a front elevational view of a connector constructed in accordance with the present invention.
Figure 2:
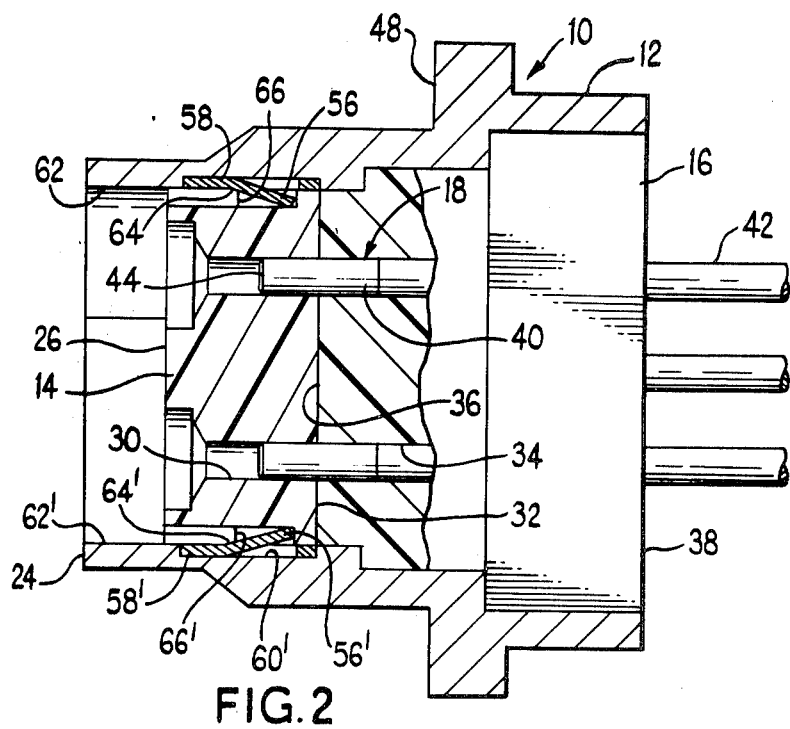
FIG. 2 is partial, vertical sectional view taken along line 2—2 of FIG. 1 showing how the retention fingers retain the front insulator within the connector shell.

Referring now to FIGS. 1 and 2 in detail, there is illustrated the connector of the present invention, generally designated 10. The connector comprises a hollow generally rectangular shell 12 which contains a front support member 14 and a rear support member 16 containing conductive elements 18. The present invention is particularly adapted to a fiber optic connector in which the conductive elements 18 contain optical fibers. This being the case, the front and rear support members 14 and 16 may be formed of either insulation material or conductive material. It is advantageous, however, that the support members be formed of insulation, such as rubber or plastic, for ease of manufacture and to minimize cost and weight. Consequently, throughout the specification the members 14 and 16 will hereinafter be referred to as the front and rear insulators of the connector. Needless to say, if the conductive elements 18 were electrical contacts, then the members 14 and 16 must be formed of electrically nonconductive material. While the invention is particularly advantageous for a fiber optic connector, it will be appreciated from the following description that the invention could also be advantageously adapted to a connector containing only electrical contact members if it is necessary or desirable to have a removable front insulator therefor.

The rear insulator 16 is fixedly mounted within the shell 12. As seen in FIG. 1, the rear insulator has forwardly extending side portions 20 adjacent to the opposite ends of the shell 12 defining a recess 22 therebetween of generally trapezoidal configuration. The front insulator 14 has a configuration complementary to the recess 22 and is slidable from the forward end 24 of the shell into such recess. When the front insulator is fully mounted in the recess 22, the forward face 26 of the front insulator is flush with the front faces 28 of the side portions 20 of the rear fixed insulator.

The front insulator 14 is formed with a plurality of passages 30 which extend from the forward face 26 to the rear face 32 of the insulator. Passages 34 are provided in the rear insulator 16 which extend from the forward face 36 thereof to the rear face 38 and in alignment with the passages 30 in the front insulator. The conductive elements 18 are mounted in the passages 30 and 34. Each conductive element 18 comprises a termination pin or contact 40 which terminates a fiber optic bundle 42 that extends rearwardly through the passage 34 in the rear insulator. The optical fibers in the bundle 42 terminate in a polished end surface at the forward end 44 of the termination pin 40. The end 44 of the pin is located within the passage 30 in the front insulator intermediate the forward face 26 and the rear face 32 of the insulator. Thus, the front insulator provides a protection for the polished forward end 44 of the optical fibers in the termination pin 40. When the connector member 10 is connected to a mating connector member, not shown, termination pins in the mating connector member similar to the pins 40 will extend into the forward ends of the passages 30 to bring the faces of the pins into abutting relationship for maximum light transmission through the fiber optic bundles of the two connector members. The conductive elements 18 may be mounted in the connector 10 in any suitable manner. For example, the elements may be releasably mounted in the rear insulator by means of circular releasable retention clips, not shown, such as disclosed in U.S. Pat. No. 3,158,424 to Bowen.

The rear fixed insulator 16 may also contain a plurality of electrical contacts 46 which are disposed in the side portions 20 of the insulator. Alternatively, all the contacts in the connector member 10 may comprise fiber optic contacts, as illustrated in FIG. 2 in which case the front insulator 14 would completely cover the face of the rear insulator.

The connector shell 12 is formed with an outwardly extending flange 48 containing a plurality of openings 50 for receiving fasteners to mount the connector to a suitable panel, not shown.

A slot 52 is formed in the top surface 54 of the front removable insulator 14. The slot extends from the forward face 26 of the insulator rearwardly to a forwardly facing shoulder 56 adjacent to the rear face 32 of the insulator. A second slot 52' is formed in the bottom surface 54' of the front insulator similar to the slot 52. The slot 52' extends to a forwardly facing shoulder 56'. It is noted from FIG. 1 that the slots 52 and 52' are in vertical alignment with each other and generally centrally positioned with respect to the connector. A retention clip 58 is mounted in a recess 60 formed in the top inner surface 62 of the shell 12. A similar retention clip 58' is mounted in a recess 60' in the bottom inner surface 62' of the shell. The retention clips 58 and 58' are aligned with the slots 52 and 52'. The retention clips embody resilient rearwardly and inwardly extending retention fingers 64, 64' which engage the respective shoulders 56, 56' on the front insulator limiting forward movement of the insulator within the shell 12. It will be appreciated that the width of the slots 52, 52' are sufficiently great to allow the retention finger 64, 64' to extend thereinto to engage the forwardly facing shoulders on the front insulator. It is further seen that the slots 52, 52' provide clearance spaces between the front insulator and the inner surface of the shell 12 allowing a tool to be inserted thereinto to engage the retention fingers, lifting the fingers out of engagement with the shoulders 56, 56', thereby allowing the front insulator to be withdrawn forwardly from the connector shell.

The connector described so far is identical to that disclosed in the aforementioned Medina patent. In accordance with the present invention, the central slot in the front insulator of Medina is eliminated by making the slots of 52, 52' of T-shaped configuration, as best seen in FIGS. 6 and 7. The T-shaped slot 52 provides a pair of rearwardly facing shoulders 66 on the sides of the slot. Similar shoulders 66' are formed on the sides of the slot 52', only one of such shoulders being visible in FIG. 2.

Reference is now made to FIGS. 3 to 5 which illustrate the extraction tool of the present invention, generally designated 70. The tool comprises a U-shaped element, generally designated 72, comprising a pair of flat parallel legs 74 joined by a base member 76. A handle 78 is fixedly mounted to the center of the base member 76.

Each leg embodies a forwardly extending, relatively rigid elongated central plate 80 and a pair of elongated relatively narrow resilient arms 82 which extend along the outer edges 84 of the central plate and spaced relative thereto. The resilient arms 82 are laterally movable toward the plate 82 as will be explained later herein. Hooks 86 are formed on the outer edges of the arms 82 adjacent to the forward end 88 of the legs 74. Each hook has a forwardly and inwardly extending tapered outer surface 90 and a rearwardly facing shoulder 92.

The forward portions of the legs 72 which include the central plate 80 and resilient arms 82 are reduced in width to define forwardly facing shoulders 94. The width of the forward portions of the legs behind the hooks 86 is slightly less than the width of the slots 52, 52', but the width of the legs at the hooks 86 is greater than the width of the slots. The thickness of the forward portions of plates 80 is such that when the plates are inserted into the slots 52, 52', they will lift the retention fingers 64, 64' out of engagement with the shoulders 56, 56' on the front insulator, in the same manner as described in the aforementioned Medina patent. The distance between the legs 74 corresponds to the distance between the slots 52, 52'. To release and remove the front insulator 14 from the connector shell 12, the forward portions of the legs 74 of the tool are aligned with the slots 52, 52'. The tapered outer surfaces 90 on each leg 74 are positioned adjacent to the edges of the slots 52, 52'. Upon pushing the tool into the slots, the resilient arms 82 on each of the legs 74 will deflect inwardly toward the central plates 80, thereby allowing the forward portions of the legs to be moved rearwardly into the slots, as seen in FIG. 6. After the hooks 86 pass the rearwardly facing shoulders 66 in the respective slots 52, 52', the arms 82 will spring outwardly so that the shoulder 92 on the hooks will engage behind the shoulders 66 on the sides of the slots. This will occur when the shoulders 112 engage the forward face 26 of the front insulator, as seen in FIG. 7. In such position of the tool in the slots, the central plates 80 will engage under the retention fingers 64, 64', releasing the fingers from engagement with the shoulders 56, 56' on the insulator, thereby releasing the insulator from the shell so that it is free floating and, therefore, can be removed by simply pulling the tool forwardly relative the connector shell.

Thus, it will be appreciated that by the present invention, there is provided a tool of very simple construction, requiring no movable parts, and may be manipulated without rotation. The tool allows the release of the retention fingers in the connector shell and the positive withdrawal of the front insulator of the shell without causing any damage to either the shell, the insulator, or the fiber optic contacts mounted within the connector. Since the T-shaped slots on the upper and lower surfaces of the front insulator provide both the forwardly facing shoulders 56, 56' for engaging the retention fingers, and the rearwardly facing shoulders 66 that are engaged by the hooks 86 on the tool, an additional central opening in the front insulator is not required, as in the Medina connector. Thus, the connector of the present invention may mount a greater number of fiber optic contacts.

While the connector disclosed herein has a rectangular configuration, it could be circular in which case the legs 74 of the tool 70 would have an arcuate configuration complementary to the circular shape of the connector.

We claim:

1. A tool for releasing and removing a support member from the front end of a connector shell containing a resilient support member retention finger extending inwardly and rearwardly from the wall of said shell into a slot between said support member and said shell comprising:
   a relatively rigid, flat retention finger releasing plate having a forward end and a rear end;
   a relatively resilient, flat arm extending along one edge of said plate in spaced relationship therewith, said arm being coplanar with said plate and resiliently laterally movable toward said plate, said arm having an inner edge adjacent to said plate and an opposite outer edge; and
   a hook on the outer edge of said arm coplanar with said plate.

2. A tool as set forth in claim 1 including:
   a second one of said arms extending along the opposite edge of said plate coplanar therewith and embodying a second one of said hooks on its outer edge whereby said two hooks extend in opposite directions.

3. A tool as set forth in claim 1 including:
   a second one of said plates and arms parallel to and spaced from said first-mentioned plate and arm and joined at one end by a base member to form an element of generally U-shaped configuration.

4. A tool as set forth in claim 3 including:
   a handle joined to said base member and extending in a direction opposite to said plates and arms.

5. A tool as set forth in claim 1 wherein:
   said hook has a forwardly and inwardly extending tapered outer edge and a rearwardly facing shoulder behind said tapered edge.

* * * * *